UNITED STATES PATENT OFFICE.

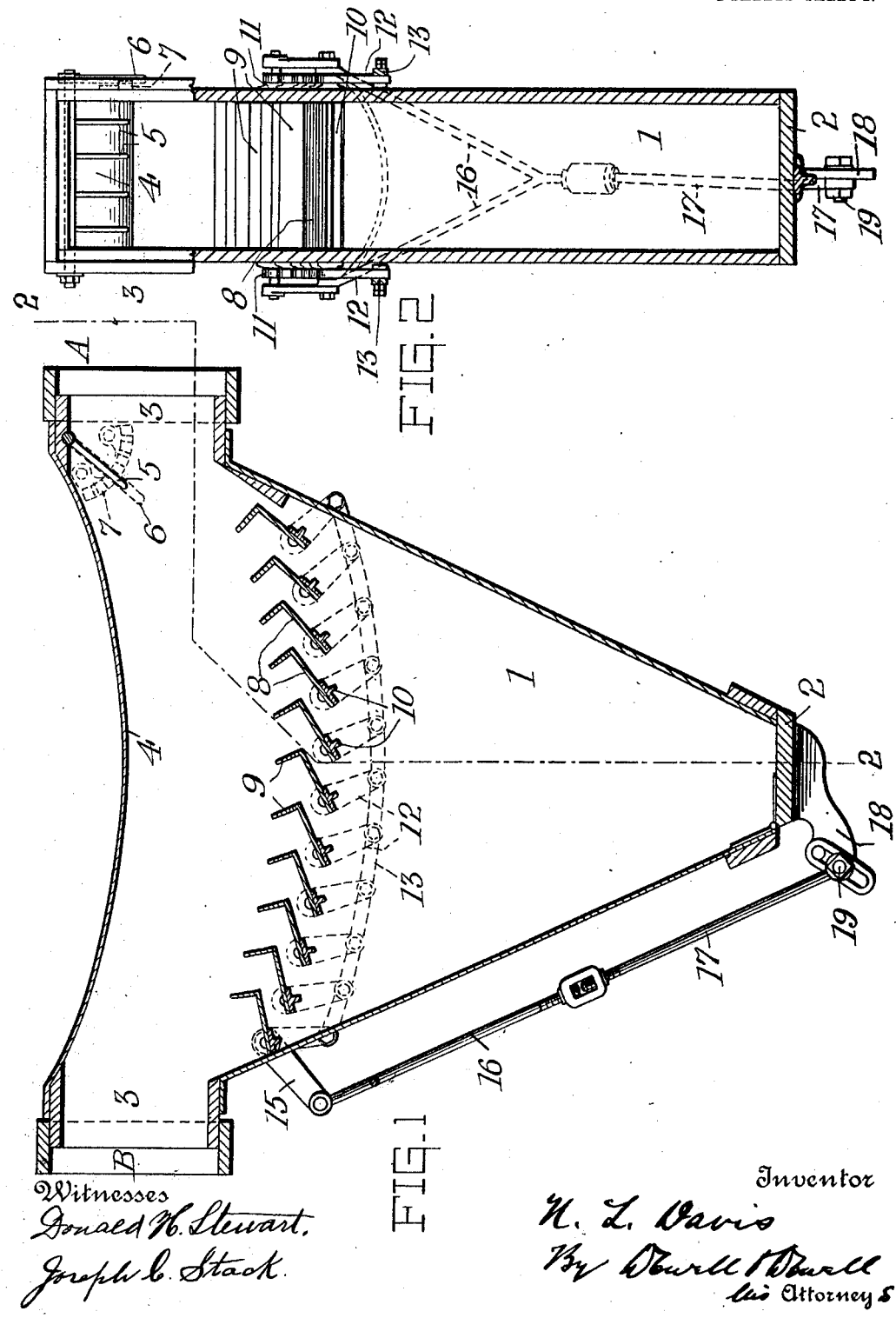

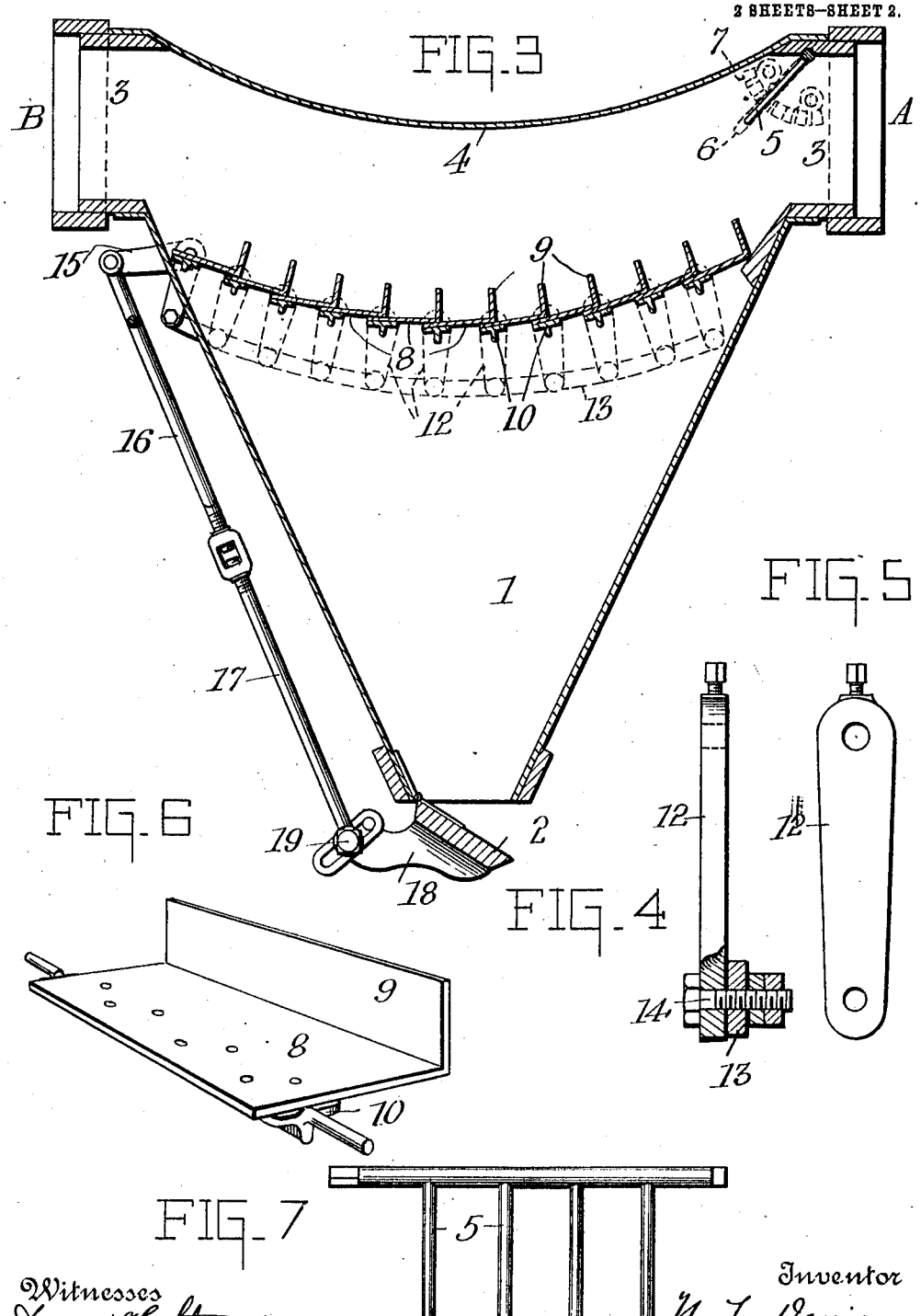

NATHAN L. DAVIS, OF ADAIRSVILLE, GEORGIA.

SEED-COTTON CLEANER AND ROCK-CATCHER.

1,003,884.  Specification of Letters Patent.  Patented Sept. 19, 1911.

Application filed April 20, 1910, Serial No. 556,535. Renewed August 10, 1911. Serial No. 643,405.

*To all whom it may concern:*

Be it known that I, NATHAN L. DAVIS, a citizen of the United States, residing at Adairsville, in the county of Bartow and State of Georgia, have invented certain new and useful Improvements in Seed - Cotton Cleaners and Rock-Catchers, of which the following is a specification.

My invention relates to means for removing rocks, nails, sand, trash and other foreign substances from seed cotton before its delivery to the gins.

The object of the invention is to provide an improved trap which is connected into the cotton supply tube or elevator to free the cotton of foreign substances as it passes through the tube on its way to the gins thereby saving the gins from injury and improving the grade of cotton.

The invention includes a shutter valve composed of movable slats which are mounted under a deflector that changes the direction of flight of the column of air carrying the cotton and directs it against the valve, the slats of which are formed to provide in their open position surfaces against which the cotton and foreign substances strike; and the latter when thus arrested in their flight drop between the slats and out of the cotton supply tube. The slats are operably connected to move together.

The shutter valve, though preferably operated by means actuated by the making and breaking of the vacuum in the cotton supply tube, is susceptible of actuation by other forces and means.

In the illustrated embodiment, which contemplates the actuation of the valve in the preferred manner, the valve is mounted in a box which communicates with the cotton supply tube and receives the foreign substances trapped out of the cotton. Such substances are temporarily retained in the box and periodically discharged therefrom by a door which is operatively connected to the shutter valve to cause the latter to open and close when the door closes and opens respectively as the vacuum is respectively formed and broken in the cotton - supply tube.

Referring to the drawings:—Figure 1 is a vertical longitudinal section through an embodiment of the invention showing the shutter-valve open to trap foreign substances out of the column of cotton. Fig. 2 is a vertical transverse section on the line 2—2 of Fig. 1. Fig. 3 is a view similar to Fig. 1 but showing the valve closed and the door open discharging the contents of the box. Fig. 4 is an edge view, partly in section, of a crank for actually a slat of the valve. Fig. 5 is a side view of the crank shown in Fig. 4. Fig. 6 is a perspective view of one of the slats of the shutter-valve. Fig. 7 is a detail view of a breaker against which the cotton strikes upon entering the trap.

1 denotes a box having a hopper shaped lower portion provided with an opening or outlet at its lower contracted end controlled by a door 2 hinged to the hopper. The box is formed at its upper end, with opposite tubular portions 3 which are adapted to be coupled or connected to adjacent portions of the pipe or tube through which the cotton passes to the gins, the box thus forming a portion of the cotton supply tube or elevator and the hopper-like portion of the box forming a pocket; and the trap or separator is or may be placed between the wagon or other receptacle containing seed cotton and the first gin. The top 4 of the box is interiorly convex providing a surface which curving downwardly from the intake A of the box and then upwardly to the outlet B, is adapted to deflect the column of cotton laden air downward out of the straight line in which it travels when entering the box and then direct the cotton back to the line of the tube.

Within the box 1, and at the intake end A thereof, is located a device for opening or breaking the wads of cotton as they enter the separator. The breaker shown is composed of a rock shaft having, within the box 1, fingers 5, and is provided outside of the box with a crank arm 6 which is adapted to play over and be engaged with a toothed segment 7 shown secured to the side of the box. An adjustment of the breaker is thus provided.

Below the interiorly convex top 4 of the box, and at a distance therefrom to provide ample room for the passage of cotton, the shutter valve is located. This valve is composed of a series of oscillatory slats 8, each of which is represented as having an upstanding lip 9 which gives the slats an L-shaped cross section. In the illustrated construction each slat is represented as formed of sheet material; and as being riveted to the flattened portion of a shaft 10, the ends of which form trunnions that project through the sides of the box 1 along a curved plane approximately concentric with the top 3 and are journaled in plates 11 secured to the opposite sides of the box. The slats overlap when the valve is in its closed position as shown in Fig. 3.

Each shaft 10 is provided with a crank 12 which may be secured to the shaft by a set screw as shown. The series of cranks 12 are connected together to swing simultaneously by a bar 13 which may be operably connected to each crank by a bolt 14 provided with a jam nut. It will thus be seen that the valve may be actuated by turning one of the shafts 10 by any mechanical means.

In the illustrated embodiment, the valve is connected to the door 2 to be opened and closed by the closing and opening respectively of the latter. The means illustrated for accomplishing this comprises cranks 15 fixed to opposite ends of one of the shafts 10, a yoke 16, one branch of which is pivotally connected to each crank 15, a connecting rod 17, having one end connected by a turnbuckle with the stem of the yoke 16, and having its other end pivotally and adjustably connected to a slotted bracket 18 by means of a pin or bolt 19 which passes through the rod 17 and slot as shown. The bracket 18 is fastened to the door 2 of the hopper. The adjustment of the rod 17 on the bracket 18, permits the distance which the door opens to be varied; as for example, to suit the power of the draft or suction.

The operation of the device, assuming the cotton to be moved through the tube to the gins by suction which is periodically discontinued or broken as when discharging the cotton to the gins, as is understood in the art, is as follows: When a vacuum is produced in the cotton tube, the atmospheric pressure closes the door 2, which by means of the rod 17 and yoke 16 pulls downwardly upon the cranks 15 thereby turning the slats to the open position of the shutter-valve as shown in Fig. 1. As cotton now enters the intake end A of the trap, the cotton strikes the breaker fingers 5 which will break up the wads of cotton shaking loose any rocks, nails, trash or other foreign substances that may be in the cotton and giving such substances a chance to fall downwardly to the valve where they will pass between the slats into the lower portions of the box. As the column of cotton laden air continues its flight beyond the breaker, such column strikes the downwardly curved or convexed top 4 of box and is deflected downwardly causing an eddy-like effect which arrests the velocity of the heavy foreign substances moving with the cotton allowing such substances to fall upon and through the valve and into the lower portion of the box or trap, while the cotton passes on with the draft to the gins. The cotton, rocks, nails and other foreign substances when deflected downwardly strike against the upstanding lips of the slats 8; and these lips while acting as a beater to shake the rocks, sand and heavy substances out of the cotton, at the same time prevent the cotton from passing downwardly between the slats into the portion of the box beneath the valve. The heavier substances being checked by striking against the lips drop down, out of the air current, between the slats and into the lower portion of the box.

When the vacuum is broken in the cotton tube by discontinuing the suction therein, the door 2 opens, discharging the substances that have been trapped out of the cotton; and the door in opening closes the shutter-valve through the medium of the connections interposed between the door and valve. This closing of the valve prevents any cotton present in the box, when the suction is broken, from falling between the slats into the box beneath. It will thus be seen that when the trap is applied to a cotton elevator in which the suction is periodically broken, the valve opens and closes at intervals with the making and breaking of the vacuum.

The trap or separator is adapted for cotton elevators of different sizes, and for any number of gins; and it may be used on various types of cotton elevators.

Having described the invention, what I claim is—

1. In a trap for removing rocks or other foreign substances from seed cotton, the combination of a shutter valve located in an opening in the cotton supply tube and formed of a series of pivoted slats connected to move together, each slat having an upturned lip, the slats overlapping in the closed position of the valve, and a deflector disposed above the valve and adapted to direct the cotton-laden air upon the valve.

2. In a trap for removing rocks or other foreign substances from seed cotton, the combination of a shutter valve communicating with the cotton supply tube and composed of a plurality of slats L-shaped in cross section, an oscillatory shaft for each slat, the slats being secured to the shafts, a crank fast to each shaft, a bar pivotally connected to all the cranks, and a deflector disposed above the shutter-valve and adapted to direct the cotton laden air upon the valve.

3. In a trap for removing rocks, trash or other foreign substances from seed cotton, a suction tube for conveying the cotton, said tube having a pocket on its under side, and a shutter valve bridging the mouth or opening of said pocket and over which the cotton passes, said valve comprising a series of slats arranged transversely of the suction tube, and means for arresting the velocity of foreign substances moving with cotton over and across said valve.

4. In a trap for removing rocks, trash or other foreign substances from seed cotton, a suction tube for conveying the cotton, said tube having a pocket on its under side, and a shutter valve bridging the mouth or opening of said pocket and over which the cotton passes, said valve comprising a series of slats arranged transversely of the suction tube, and means for deflecting the cotton-charged air current against said valve in passing thereover.

5. In a trap for removing rocks, trash or other foreign substances from seed cotton, a suction tube for conveying the cotton, said tube having a pocket on its under side, and a concave shutter valve in the mouth or opening of said pocket, over which the cotton passes, said valve comprising a series of transversely-arranged slats, and the interior wall of the suction tube opposite said valve being convex for the purpose described.

6. In a trap for removing rocks, trash or other particles from seed cotton, a suction tube for conveying the cotton, said tube having a pocket, and a shutter valve controlling the opening thereinto and across which the cotton passes, said valve comprising a series of transverse slats which when the valve is open are inclined upwardly toward the intake end of the suction tube, said slats having rear upstanding lips which, in the aforesaid position of the slats, are inclined toward the outlet end of the tube.

7. A separator of the character described comprising a hopper-like box having a convex interior top and having opposite openings for the intake and outlet of a cotton-charged air-current, a concave shutter-valve opposite said convex interior top, a trap-door at the bottom or smaller end of the box, and operative-connections between said trap-door and valve whereby one opens when the other closes.

In testimony whereof I affix my signature, in presence of two witnesses.

NATHAN L. DAVIS.

Witnesses:
T. D. BARTON,
A. W. BARBER.

---

Copies of this patent may be obtained for five cents each, by addressing the "Commissioner of Patents, Washington, D. C."